(12) United States Patent
Kaul et al.

(10) Patent No.: US 12,466,126 B2
(45) Date of Patent: Nov. 11, 2025

(54) ADDITIVE MANUFACTURING METHOD FOR PRODUCING A MOLDED ARTICLE FROM ELASTOMER

(71) Applicant: FREUDENBERG SE, Weinheim (DE)

(72) Inventors: Stefan Kaul, Hemsbach (DE); Sebastian Schmitt-Ferrarese, Hirschberg (DE); Britta Anders, Moerlenbach (DE); Jens Fiebiger, Laudenbach (DE); Denis Bittner, Mainz (DE)

(73) Assignee: CARL FREUDENBERG KG, Weinheim (DE)

( * ) Notice: Subject to any disclaimer, the term of this patent is extended or adjusted under 35 U.S.C. 154(b) by 681 days.

(21) Appl. No.: 17/604,767

(22) PCT Filed: Apr. 20, 2020

(86) PCT No.: PCT/EP2020/060985
§ 371 (c)(1),
(2) Date: Oct. 19, 2021

(87) PCT Pub. No.: WO2020/216710
PCT Pub. Date: Oct. 29, 2020

(65) Prior Publication Data
US 2022/0193984 A1 Jun. 23, 2022

(30) Foreign Application Priority Data
Apr. 25, 2019 (DE) ..................... 10 2019 110 718.0

(51) Int. Cl.
*B29C 64/118* (2017.01)
*B29C 64/321* (2017.01)
(Continued)

(52) U.S. Cl.
CPC .......... *B29C 64/118* (2017.08); *B29C 64/321* (2017.08); *B33Y 10/00* (2014.12); *B33Y 30/00* (2014.12); *B33Y 70/00* (2014.12)

(58) Field of Classification Search
CPC ..... B29C 64/118; B29C 64/321; B33Y 10/00; B33Y 30/00; B33Y 70/00
See application file for complete search history.

(56) References Cited

U.S. PATENT DOCUMENTS

2013/0071599 A1* 3/2013 Kraibuhler ............ B29C 64/176
428/57
2014/0284839 A1 9/2014 Kraibühler et al.
(Continued)

FOREIGN PATENT DOCUMENTS

| CN | 106956406 A | 7/2017 |
|---|---|---|
| DE | 102009030099 A1 | 12/2010 |

(Continued)

*Primary Examiner* — JaMel M Nelson
(74) *Attorney, Agent, or Firm* — LEYDIG, VOIT & MAYER, LTD.

(57) ABSTRACT

A method is provided for producing a molded article from a non-thermoplastic material. The method includes: supplying the non-thermoplastic elastomer material to a processing unit; processing the non-thermoplastic elastomer material to generate a material flow of the non-thermoplastic elastomer material; conveying the non-thermoplastic elastomer material into an accumulator unit to generate a nominal pressure of the non-thermoplastic elastomer material in the accumulator unit; conveying the non-thermoplastic elastomer material to a molding unit to selectively output at least one layer of the molded article to be formed; and cross-linking the at least one layer of the molded article or of the entire molded article by means of a cross-linking unit. The non-thermoplastic elastomer material is highly viscous, and has a viscosity in the range of 100 to 1,000,000 Pa·s.

17 Claims, 1 Drawing Sheet

(51) Int. Cl.
*B33Y 10/00* (2015.01)
*B33Y 30/00* (2015.01)
*B33Y 70/00* (2020.01)

(56) References Cited

U.S. PATENT DOCUMENTS

| | | | |
|---|---|---|---|
| 2017/0312981 A1* | 11/2017 | Selbertinger | B29C 64/264 |
| 2018/0207863 A1 | 7/2018 | Porter et al. | |
| 2018/0208797 A1 | 7/2018 | Achenbach et al. | |
| 2019/0010311 A1 | 1/2019 | Yoshinaga et al. | |
| 2020/0238601 A1 | 7/2020 | Pachaly et al. | |
| 2020/0317923 A1* | 10/2020 | Gottschalk-Gaudig | C08L 91/06 |

FOREIGN PATENT DOCUMENTS

| | | | | |
|---|---|---|---|---|
| EP | 1886793 B1 * | 3/2011 | | B29C 64/112 |
| EP | 2782742 B1 | 5/2017 | | |
| JP | 2017533851 A | 11/2017 | | |
| WO | WO 2014108857 A1 | 7/2014 | | |
| WO | WO 2017005803 A1 | 1/2017 | | |
| WO | WO 2017154335 A1 | 9/2017 | | |
| WO | WO 2018087293 A2 | 5/2018 | | |
| WO | WO 2018153467 A1 | 8/2018 | | |
| WO | WO 2019/063094 A1 | 4/2019 | | |

\* cited by examiner

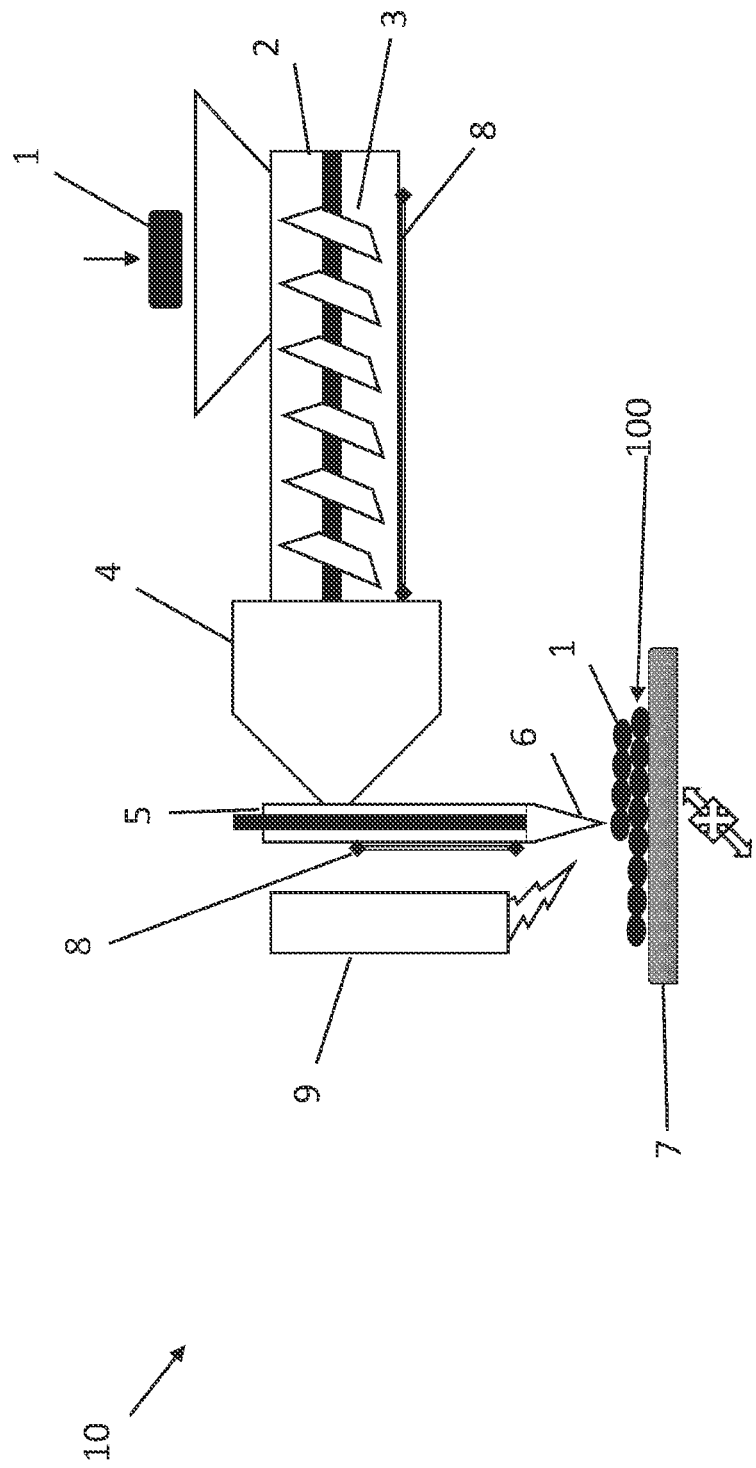

ADDITIVE MANUFACTURING METHOD FOR PRODUCING A MOLDED ARTICLE FROM ELASTOMER

CROSS-REFERENCE TO PRIOR APPLICATIONS

This application is a U.S. National Phase application under 35 U.S.C. § 371 of International Application No. PCT/EP2020/060985, filed on Apr. 20, 2020, and claims benefit to German Patent Application No. DE 10 2019 110 718.0, filed on Apr. 25, 2019. The International Application was published in German on Oct. 29, 2020 as WO 2020/216710 under PCT Article 21(2).

FIELD

The invention relates to a manufacturing method for producing a molded article.

BACKGROUND

The extrusion, metering, and injection molding of elastomer molding masses are standardly used in industrial processes—for example, for the production of seals and membranes. Elastomer prepared in extruders is introduced into injection molds by means of nozzles. Small nozzles with average channel diameters of 1-5 mm are used. The pressure loss inside the nozzle is strongly dependent upon the nozzle geometry and the flow rate, as well as upon the material viscosity.

It is also generally known, and increasingly common, to process a wide variety of materials by so-called three-dimensional (3D) printing and to manufacture products in an additive manufacturing process. A system for layer-by-layer construction of products made of thermoplastic materials in additive manufacturing is thus known. Such a system is described in, for example, DE 10 2009 030 099 A1, EP 1 886 793 B1, and EP 2 782 742 81 B1.

SUMMARY

In an embodiment, the present invention provides

An aim of the present invention is to describe a method for producing a molded article by means of which molded articles can be produced from non-thermoplastic elastomer material. A further aim is that the method can also produce molded articles with particularly fine structures with high precision.

BRIEF DESCRIPTION OF THE DRAWINGS

The embodiments of the present disclosure will be described in even greater detail below based on the exemplary figures. The embodiments are not limited to the exemplary embodiments described herein. Other features and advantages of various embodiments of the present disclosure will become apparent by reading the following detailed description with reference to the attached drawings, which illustrate the following:

FIG. 1 illustrates a device for producing a molded article in an additive manufacturing process.

DETAILED DESCRIPTION

This disclosure provides a manufacturing method for producing a molded article from a non-thermoplastic elastomer material. The elastomer material is highly viscous and may have a viscosity in the range of 100 to 1,000,000 Pa·s.

It has been found to be advantageous to process a non-thermoplastic elastomer material in an additive manufacturing method and to produce molded articles in the process.

The method according to the invention serves as an additive manufacturing method for producing a three-dimensional molded article made of non-thermoplastic elastomer material consisting of at least one layer. The material is thus a rubber-like material, excluding thermoplastic elastomers. The method has the following steps:

a) Supplying an elastomer material as raw material in the form of a skin (i.e., a mat of elastomer material), a strip, a puck (i.e., a disk of elastomer material), or a cord to a processing unit.

b) Processing the elastomer material in the processing unit and generating a material flow of the elastomer material. A certain viscosity of the elastomer material can also be generated, and thermal and material homogenization can take place.

c) Conveying the elastomer material into an accumulator unit and generating a nominal pressure of the elastomer material in the accumulator unit. The nominal pressure here lies, in particular, in a range of less than 600 bar and depends upon the processed material.

d) Conveying the elastomer material to a molding unit, in which the elastomer material is selectively output to produce at least one layer of the molded article to be formed, and thus to form the molded article in layers. The elastomer material is conveyed, in particular, with a mass flow in the range of 0.5-30 g/h.

e) Cross-linking the at least one layer of the molded article or of the entire molded article by means of a cross-linking unit, wherein the cross-linking can take place thermally, optically, or chemically.

Method steps a) through e) can be carried out, in particular, in a machine—a device for producing a molded article. Alternatively, the device for producing a molded article can be designed such that step e) can take place in a separate device arranged at a distance, viz., when cross-linking of the entire molded article takes place.

The elastomer material is a non-thermoplastic elastomer material in accordance with the ASTM D1418-17 standard, "Standard Practice for Rubber and Rubber Latices—Nomenclature."

The technically interesting properties of the non-thermoplastic elastomer material are achieved only by compounding. Compounding refers to the addition of certain additives, e.g., fillers, anti-aging agents, plasticizers, processing aids, cross-linking chemicals, etc. The type and amount of the additives depend upon the required property profile of the material in each case. In the cross-linking process, known as vulcanization of the non-thermoplastic elastomer material, irreversible chemical cross-linking sites are formed.

These high-polymer, organic networks have high elasticity and are capable of reversibly large deformations.

The elastomer material, which is conveyed into the accumulator unit in step c), is a pre-mixed material to which no further substances are added.

Particularly preferably, the non-thermoplastic elastomer material is a material consisting of chemically cross-linked rubber.

In the method, the elastomer material is highly viscous, i.e., not liquid, during steps a) through d), and is also cross-linkable. The elastomer material has, in particular, a viscosity, i.e., a resistance to shear, in the range of 100 to 1,000,000 Pa·s. Thus, there is a viscosity which is significantly higher in comparison to thermoplastics processed in the injection molding process, for example.

That such a method works with non-thermoplastic elastomer material is surprising.

The calculation of pressure losses of material transported through a nozzle is described, inter alia, in the reference work, "Extrusion Dies for Plastics and Rubber," Michaeli, 2nd Edition, Chapter 2.1 and Chapter 3.1.

The pressure loss calculation is based upon the Hagen-Poiseuille law for laminar flow of an incompressible viscous fluid through a pipe:

$$\Delta p = \frac{8\dot{V}\eta l}{\pi r^4}$$

$\Delta V$=volumetric flow through the pipe [m³/s]
$\Delta p$=pressure difference between the beginning and end of a pipe [Pa]
r=internal radius of the pipe [m]
l=length of the pipe [m]
$\eta$=viscosity of flowing liquid [Pa s]

For the production and, for example, metering of strands having a diameter with standard elastomer compounds and conventional viscosities, very high pressures of about 700 to well above 10,000 bar are required, according to the conventional calculation laws from the literature, to achieve mass flows of 0.5-30 g/h. However, such high pressures would be difficult to generate and would not be practical. Surprisingly, it has been found that lower pressures are also sufficient for molding and outputting elastomer material in a molding unit. This is because the actual pressure loss of elastomer material during conveyance by a molding unit, e.g., a fine nozzle, is significantly lower than would have been expected according to the calculation customary in the art.

In a particularly advantageous and therefore preferred development of the method, the elastomer material used is not solidifiable and is thereby elastic or viscoelastic. That means the elastomer material never assumes a solid phase, but retains its elastic or viscoelastic property.

The elastomer material can, for example, be polyacrylate rubber (ACM), nitrile rubber (NBR), ethylene propylene diene rubber (EPDM), or solid silicone rubber (high-consistency rubber HCR).

In a possible embodiment of the method, the elastomer material is processed in step b) using one or more screws, a piston pump, a gear pump, and/or a static mixer.

It has proven to be particularly advantageous in step b) and/or in step d) to perform a control and regulation of the temperature of the elastomer material to above 20° C. and below 150° C.—in particular, to below 90° C. and, in the case of processing of HCR, to below 35° C. Premature cross-linking of the elastomer material can thus be prevented. Thus, there is a temperature which, in comparison to thermoplastics processed in the injection molding process, for example, is significantly lower.

For this purpose, the processing unit and/or the molding unit can have a temperature control device for cooling and/or heating the elastomer material.

In a possible embodiment, the molding unit in step d) can be designed as a nozzle—in particular, as a clocked nozzle. Alternatively, an open nozzle would also be conceivable. The clocked nozzle has a closing means that can be controlled in a clocked manner so that, alternately, elastomer material is pressed through the nozzle, and the nozzle is then closed again. It appears particularly advantageous if the nozzle has a diameter of less than 0.25 mm. Molded articles with particularly fine structures can thus be generated.

It has proven to be advantageous if the elastomer material has a shear rate of 10 to 5,500 1/s in the region of the nozzle. The prevailing pressure losses are then relatively low. The shear rate is also referred to as the shear velocity.

It has been found that it is particularly advantageous to output the elastomer material in step d) of the method in a sequential form. This means that the elastomer material is not output continuously, but, rather, a certain, definable amount of the elastomer material, whereupon no elastomer material is output during a pause. This can be realized by using a clocked nozzle. The sequential form is in contrast to the continuous form—for example, a strand.

In a particularly advantageous and therefore preferred development of the method, the elastomer material is output in the form of a bead chain.

The bead chain is characterized by a series of beads, viz., by a diameter, which changes in the shape of beads, on a strand. The diameter can vary by 1 to 15%. Bead chains having an average diameter of less than 1 mm—in particular, less than 0.3 mm—are preferred.

The geometry and packing density of the bead chain can be adjusted and adapted by the cycle frequency of the closure means of the clocked nozzle. It has been found that, by means of a bead chain, particularly fine structures of the molded article can be realized. A further advantage results because corners in the molded article can be generated more easily than, for example, when the elastomer material is output in the form of a strand. It also seems advantageous that, in the case of bead chains, a narrower packing density of the elastomer material in the molded article can be achieved in comparison to strands.

In the method, in steps d) and e), a relative movement between the molding unit or the cross-linking unit and a mold-receiving unit, i.e., a carrier for the molded article to be produced, can take place for positioning the output elastomer material or for positioning the effective range of the cross-linking unit. The output elastomer material can thus be deposited in a targeted manner on the mold-receiving unit or an elastomer layer already located there. Precision positioning systems which enable multi-axis positioning, and thus the required relative movement, are known to the person skilled in the art.

In an advantageous variant of the method according to the invention, steps d) and e) are repeated alternately in order to build up and cross-link individual layers of the molded article before a respective next layer is applied.

In an advantageous variant of the method, an application of support material to generate a support region takes place in an additional step, wherein the steps of applying elastomer material and applying support material take place alternately, depending upon the geometry of the molded article to be generated. The support material then forms the support structure for subsequently output layers of elastomer material. The support material is selected such that it can easily be removed again later. It may, for example, be water-soluble or be soluble in a base which does not attack the elastomer material. Molded articles with complex geometry can thus, in an advantageous way, also be generated.

The described embodiments constitute advantageous further embodiments in combination with one another, insofar as this is technically reasonable.

With regard to further advantages and embodiments that are advantageous from a design and function standpoint, reference is made to the dependent claims and to the description of exemplary embodiments, with reference to the accompanying FIGURE.

Exemplary Embodiment

In tests, the described pressure losses were achieved with the following geometries, materials, and viscosities. Theoretical pressure losses are the specified, substantially higher, values:

| Material | Viscosity in [Pas] at T [° C.] and $\dot{\gamma}$ [1/s] | Diameter D [mm] | L/D | Volume flow $\dot{V}$ [mm³/s] | Pressure loss, theoretical [bar] | Pressure loss, practical [bar] |
|---|---|---|---|---|---|---|
| 70 NBR | 1,100 T = 90 $\dot{\gamma}$ 2,002 | 0.25 | 10 | 0.628 | 2,000 | 380 |

$\dot{\gamma}$ Shear rate
T Temperature
D Diameter of the nozzle
L/D Length/diameter ratio of the nozzle The pressure losses measured in practical series of tests in the case of further materials (several hundred bar) in very fine nozzles with a diameter of less than 0.3 mm were significantly lower compared to the calculated pressure losses (several thousand bar). Through these series of tests, it was thus possible to confirm that elastomer material can be pressed through molding units, such as thin nozzles, and a molded article made of elastomer material can thus be produced in an additive manufacturing method.

FIG. 1 shows a device 10 for producing a molded article 100, in which a molded article 100 is produced in an additive manufacturing method from an elastomer material 1. For this purpose, elastomer material 1 is supplied to a processing unit 2 and processed there by means of a screw 3.

The elastomer material 1 processed in this way is supplied to an accumulator unit 4, by means of which it is provided to a molding unit 5 having a nozzle 6.

A mold-receiving unit 7 is arranged below the nozzle 6 and is freely movable. On this, elastomer material 1 exiting the nozzle 6 is deposited, and the molded article 100 is thus formed. A cross-linking unit 9 is arranged in the vicinity of the nozzle 6 and serves to cross-link the layers of elastomer material 1. The processing unit 2 and the molding unit 5 can each be assigned one temperature control device 8 for regulating the temperature of the elastomer material 1 in the processing unit 2 and the molding unit 5.

In an alternative embodiment, not shown, the nozzle 6, and possibly also the cross-linking unit 9, are moved relative to the mold-receiving unit 7.

The cross-linking unit 9 could also be arranged separately and spaced apart from the other components of the device 10, viz., when the entire molded article 100 as a whole is to be cross-linked.

The method can be carried out with the device 10 for producing a molded article 100.

In a first step, an elastomer material 1 is supplied to a processing unit 2. Processing of the elastomer material 1 is performed in the processing unit 2, and a material flow of the elastomer material 1 is generated. The elastomer material 1 is processed using a screw 3, which conveys the elastomer material 1 into an accumulator unit 4, where a nominal pressure is built up that is sufficient to output the elastomer material 1 through a molding unit 5. In the molding unit 5, which is designed as a clocked nozzle 6, the elastomer material 1 is selectively output in the sequential form of a bead chain. A layer of the molded article 100 to be formed is thus deposited on a mold-receiving unit 7. The processing unit 2 and the molding unit 5 have a temperature control device 8 for cooling and/or heating the elastomer material 1, such that the temperature of the elastomer material 1 is monitored and regulated to above 20° C. and below 150° C. Premature cross-linking of the elastomer material can thus be prevented.

The at least one layer of the molded article 100 is cross-linked in a next step by a cross-linking unit 9. Application of the elastomer material 1 and cross-linking of the layer are repeated alternately in order to build up and cross-link individual layers of the molded article 100 until the molded article 100 is completed.

As indicated by double arrows, a relative movement between the molding unit 5 and a mold-receiving unit 7 is enabled for positioning the output elastomer material 1.

As indicated by double arrows, a relative movement between the cross-linking unit 9 and a mold-receiving unit 7 is also enabled for positioning the effective range of the cross-linking unit 9.

In an alternative embodiment of the method, not shown, the nozzle 6, and possibly also the cross-linking unit 9, are moved relative to the mold-receiving unit 7.

The cross-linking unit 9 could also be arranged separately and spaced apart from the other components of the device 10, viz., when the entire molded article 100 as a whole is to be cross-linked. The molded article 100 is then transported to the cross-linking unit 9 between the step of "applying elastomer material 1" to form the molded article and the step of "cross-linking."

While the embodiments have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present disclosure covers further embodiments with any combination of features from different embodiments described above and below. Additionally, statements made herein characterizing the embodiments refer to an embodiment and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for producing a molded article from a non-thermoplastic elastomer material, the method comprising:
    supplying the non-thermoplastic elastomer material to a processing unit of a device for producing the molded article;
    processing the non-thermoplastic elastomer material in the processing unit such that thermal and material homogenization occurs and generating a material flow of the thermally and materially homogenized non-thermoplastic elastomer material;
    conveying the material flow of the thermally and materially homogenized non-thermoplastic elastomer material into an accumulator unit of the device and generating a nominal pressure of the non-thermoplastic elastomer material in the accumulator unit;
    conveying the non-thermoplastic elastomer material from the accumulator unit to a molding unit of the device embodied as a clocked nozzle, in which the non-thermoplastic elastomer material is selectively and sequentially output as a chain of beads to generate at least one layer of the molded article to be formed; and
    cross-linking the at least one layer of the molded article or of the entire molded article by means of a cross-linking unit, wherein the non-thermoplastic elastomer material is viscous, subsequent to the processing and prior to the cross-linking, and has a viscosity in the range of 100 to 1,000,000 Pa·s.

2. The method according to claim 1, wherein the non-thermoplastic elastomer material is not solidifiable and is elastic or viscoelastic.

3. The method according to claim 1, wherein the non-thermoplastic elastomer material is designed as polyacrylate rubber (ACM), nitrile rubber (NBR), ethylene propylene diene rubber (EPDM), or solid silicone rubber (HCR).

4. The method according to claim 1, wherein the non-thermoplastic elastomer material is processed using one or more screws, a piston pump, a gear pump, and/or a static mixer.

5. The method according to claim 1, wherein the temperature of the non-thermoplastic elastomer material is monitored and regulated to below 150° C.

6. The method according to claim 5, wherein the processing unit and/or the molding unit include a temperature control device for cooling and/or heating the non-thermoplastic elastomer material.

7. The method according to claim 1, wherein the non-thermoplastic elastomer material has a shear rate of 10 to 5,500 1/s in a region of the nozzle.

8. The method according to claim 1, wherein a relative movement between the molding unit or the cross-linking unit and a mold-receiving unit takes place in order to position the output non-thermoplastic elastomer material or to position an effective range of the cross-linking unit.

9. The method according to claim 1, wherein the conveying the non-thermoplastic elastomer material to the molding unit and the cross-linking are repeated, alternately, for each layer of the at least one layer to build up and cross-link individual layers of the molded article.

10. The method according to claim 1, of the method further comprising:
    outputting support material to generate a support region of the molded article.

11. The method according to claim 1, wherein a diameter of each of the beads varies by 1 to 15% along the chain of beads.

12. The method according to claim 11, wherein an average diameter of the beads is less than 1 mm.

13. The method according to claim 12, wherein the average diameter of the beads is less than 0.3 mm.

14. The method according to claim 4, wherein the nominal pressure generated in the accumulator unit is generated by the processing unit by the one or more screws, piston pump, gear pump, and/or static mixer.

15. The method according to claim 14, wherein the nominal pressure generated by the processing unit is generated as a result of thermal and material homogenization of the non-thermoplastic elastomer material and as a result of generating the material flow of the thermally and materially homogenized non-thermoplastic elastomer material, and wherein the nominal pressure is sufficient to cause the non-thermoplastic elastomer material to be conveyed from the accumulator unit to the molding unit of the device.

16. The method according to claim 1, wherein the processing unit and the molding unit include a temperature control device, wherein the processing the non-thermoplastic elastomer material and the conveying the non-thermoplastic elastomer material from the accumulator unit to the molding unit of the device are temperature controlled, by the temperature control device, to a range above 20° C. and below 90° C.

17. The method according to claim 16, wherein the non-thermoplastic elastomer material is designed as solid silicone rubber (HCR), and wherein the processing the non-thermoplastic elastomer material and the conveying the non-thermoplastic elastomer material from the accumulator unit to the molding unit of the device are temperature controlled, by the temperature control device, to a range above 20° C. and below 35° C.

* * * * *